US008401965B2

(12) United States Patent
Johnson et al.

(10) Patent No.: US 8,401,965 B2
(45) Date of Patent: Mar. 19, 2013

(54) PAYMENT HANDLING

(75) Inventors: Shane Anthony Johnson, Charlotte, NC (US); John Scott Walbert, Mooresville, NC (US); William Thomas Sanders, Denver, NC (US); Victoria Lynn Dravneek, Charlotte, NC (US); John Daniel Shaver, Charlotte, NC (US); Margaret Morgan Weichert, Charlotte, NC (US); Bethann Johnston, Atlanta, GA (US); Karren D. Grant, Norcross, GA (US); Daniel Christopher Bohen, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 58 days.

(21) Appl. No.: 11/931,475

(22) Filed: Oct. 31, 2007

(65) Prior Publication Data
US 2009/0112760 A1 Apr. 30, 2009

(51) Int. Cl.
*G06Q 40/00* (2012.01)
(52) U.S. Cl. ............... 705/40; 705/35; 705/53; 705/51; 705/71; 705/79; 713/171; 709/217; 370/332
(58) Field of Classification Search ............... 705/1–45, 705/53, 51, 71, 79; 713/171; 709/217; 370/331
See application file for complete search history.

(56) References Cited

U.S. PATENT DOCUMENTS

| 5,903,881 | A * | 5/1999 | Schrader et al. | 705/42 |
|---|---|---|---|---|
| 5,920,847 | A * | 7/1999 | Kolling et al. | 705/40 |
| 6,757,664 | B1 * | 6/2004 | Cardinal et al. | 705/38 |
| 2002/0026394 | A1 * | 2/2002 | Savage et al. | 705/34 |
| 2003/0055727 | A1 * | 3/2003 | Walker et al. | 705/14 |
| 2003/0167231 | A1 * | 9/2003 | Winking et al. | 705/40 |
| 2003/0216996 | A1 * | 11/2003 | Cummings et al. | 705/39 |
| 2003/0236726 | A1 * | 12/2003 | Almonte et al. | 705/35 |
| 2004/0133514 | A1 * | 7/2004 | Zielke et al. | 705/40 |
| 2004/0215564 | A1 * | 10/2004 | Lawlor et al. | 705/40 |
| 2005/0038714 | A1 * | 2/2005 | Bonet et al. | 705/26 |
| 2005/0131816 | A1 * | 6/2005 | Britto et al. | 705/39 |
| 2005/0161502 | A1 * | 7/2005 | Smith et al. | 235/379 |
| 2006/0143124 | A1 * | 6/2006 | Ehrke | 705/40 |
| 2006/0173779 | A1 * | 8/2006 | Bennett et al. | 705/40 |

(Continued)

OTHER PUBLICATIONS

International Search Report and Written Opinion issued in corresponding PCT Application No. PCT/US2008/082100; mailed Feb. 19, 2009.

(Continued)

*Primary Examiner* — Tien Nguyen
(74) *Attorney, Agent, or Firm* — Banner & Witcoff, Ltd.; Michael A. Springs

(57) ABSTRACT

Systems and methods are disclosed for handling a payment at a point of sale or a remote payment acceptance and processing location for a customer account. The systems and methods may include receiving a payment at a point of sale or a remote payment acceptance and processing location and identifying data including at least an amount of the payment that is associated with the payment. The data may be transmitted over a computer network and stored in a data store that is associated with a customer account. A balance of the customer account may be rapidly updated based on the data associated with the payment. The data may be transmitted over a computer network and may be utilized in a computer software application to provide a customer account with rapid recognition of a payment and of a total balance.

12 Claims, 3 Drawing Sheets

U.S. PATENT DOCUMENTS

| | | | |
|---|---|---|---|
| 2006/0229978 A1* | 10/2006 | Popovic et al. | 705/39 |
| 2007/0033137 A1* | 2/2007 | Provost et al. | 705/40 |
| 2007/0038561 A1* | 2/2007 | Vancini et al. | 705/39 |
| 2007/0063016 A1* | 3/2007 | Myatt et al. | 235/379 |
| 2007/0083397 A1* | 4/2007 | Bryan | 705/4 |
| 2007/0260562 A1* | 11/2007 | Hutson et al. | 705/412 |

OTHER PUBLICATIONS

Mexican Office Action for Application No. MX/a/2010/004745 mailed Aug. 13, 2012.

Mexican Office Action (with English translation) for Mexican application No. MX/a/2010/004745 issued May 24, 2012.

Office Action from EP Application No. 08 844 788.3 dated Feb. 22, 2012.

Website article http://en.wikipedia.org/wiki/BACS dated Mar. 23, 2012 for Fast Payments Service.

Website article http://www.telegraph.co.uk/finance/personalfinance/constumpertips/banking/2907932, published Mar. 16, 2005.

English translation of Chinese Office Action for CN application No. 2008801141368 issued Mar. 1, 2012.

\* cited by examiner

PAYMENT HANDLING

FIELD OF THE INVENTION

Aspects of the present invention relate to handling payments and rapidly posting the payments to a customer's account. More specifically, in one aspect, it is directed to a system and method of managing commercial payments by consolidating a plurality of payments from one or more of a point of sale and a remote payment acceptance and processing location to a customer's account.

BACKGROUND

Most commercial entities receive multiple payments from their customers for goods, services, debts, and the like and issue multiple customer credits within a business day. Detailed management of these financial transactions must be kept by the commercial entity. Such management can be confusing, time-consuming, costly and laden with errors and may result in significant delay of posting a transaction to a customer's account.

Properly managing the financial transactions for a commercial entity is critical to the entity's financial health and economic status, both internally and externally. Accurate accounting of the financial transactions occurring within a financial entity aids the management to make sound financial decisions on daily operations and prepare successful long term strategies. Internal management relies on the status of the business entity's financial health in making strategy decisions. External parties closely scrutinize a commercial entity's financial health when analyzing the value of the commercial entity, evaluating the entity's economic value, determining whether to lend credit to the entity, determining the market value/economic viability of the entity, and the like.

Delaying the posting of a financial transaction to a customer's account prevents the customers from accurately detailing their financial status over the course of a period of time, such as a business day, quarter, and/or fiscal year. In the daily calculation of financial transactions, a short delay may cause inaccurate accounting and cause a commercial entity to delay or refrain from engaging in such activities as investing, paying debts, extending credit, making an initial public offering, selling additional securities, preparing reports for stockholders, preparing tax documents, selling and/or purchasing securities, acquiring another business entity, reporting to government agencies, or otherwise engaging in financial activities.

Oftentimes, business entities implement a system to track financial transactions after the transactions occur to maintain a detailed record of the financial transactions. Many business entities may also perform a periodic accounting of the financial state of their accounts and calculate such things as a total balance of funds in the account, a total amount of sales, a total amount of credits, an itemization of large and/or unique transactions, and the like.

Business entities, especially large commercial entities conducting a high volume of financial transactions within one business day, would significantly benefit from a system that rapidly recognizes a financial transaction to a customer account. Further, a business entity may rely upon a current financial status if each financial transaction was processed and rapidly posted to the customer's account.

SUMMARY OF THE INVENTION

In one aspect, a method of payment handling, comprises: receiving a payment at a payment acceptance and processing location (e.g., retail lockbox, wholesale lockbox, online banking, etc.); identifying data that relates to the payment that includes at least an amount of the payment; transmitting and saving the data relating to at least the payment from the point of sale or remote payment acceptance and processing location to a data store on a computer network that is associated with a customer account; applying the payment to a balance in the customer account; and posting the balance in rapid recognition to the customer account to reflect the payment. The balance may include a plurality of transactions that are calculated over a period of time.

In another aspect of the invention, a method of tracking an account balance in a customer account, comprises: identifying a customer account having a unique identifier that is linked to a data store associated with the customer account; receiving a payment at a point of sale or remote payment acceptance and processing location for the customer account, the payment includes at least one of cash, credit card, charge card, automated teller machine card, negotiable instrument, and online bill payment; calculating an account balance for the customer account that includes at least a first transaction and a second transaction, the first and second transaction being added together.

In yet another aspect of the invention, an apparatus for handling payments, comprises: a memory for storing a plurality of modules comprising computer-executable instructions and a processor that is configured to execute the computer-executable instructions in the plurality of modules to provide a customer account with a total balance after a transaction is received at a point of sale or remote payment acceptance and processing location. The plurality of modules may including a point of sale or remote payment acceptance and processing module that is configured to receive a transaction include a transaction amount at a point of sale or a remote payment acceptance and processing location; a transmission module that is configured to transmit the transaction information to a data store that is associated with a customer account and saved in the memory, the data store configured to store data including the transaction information; and a rapid recognition module configured to calculate a total balance by adding the transaction amount to the balance, where the rapid recognition module provides immediate reporting of the total balance to the customer account.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
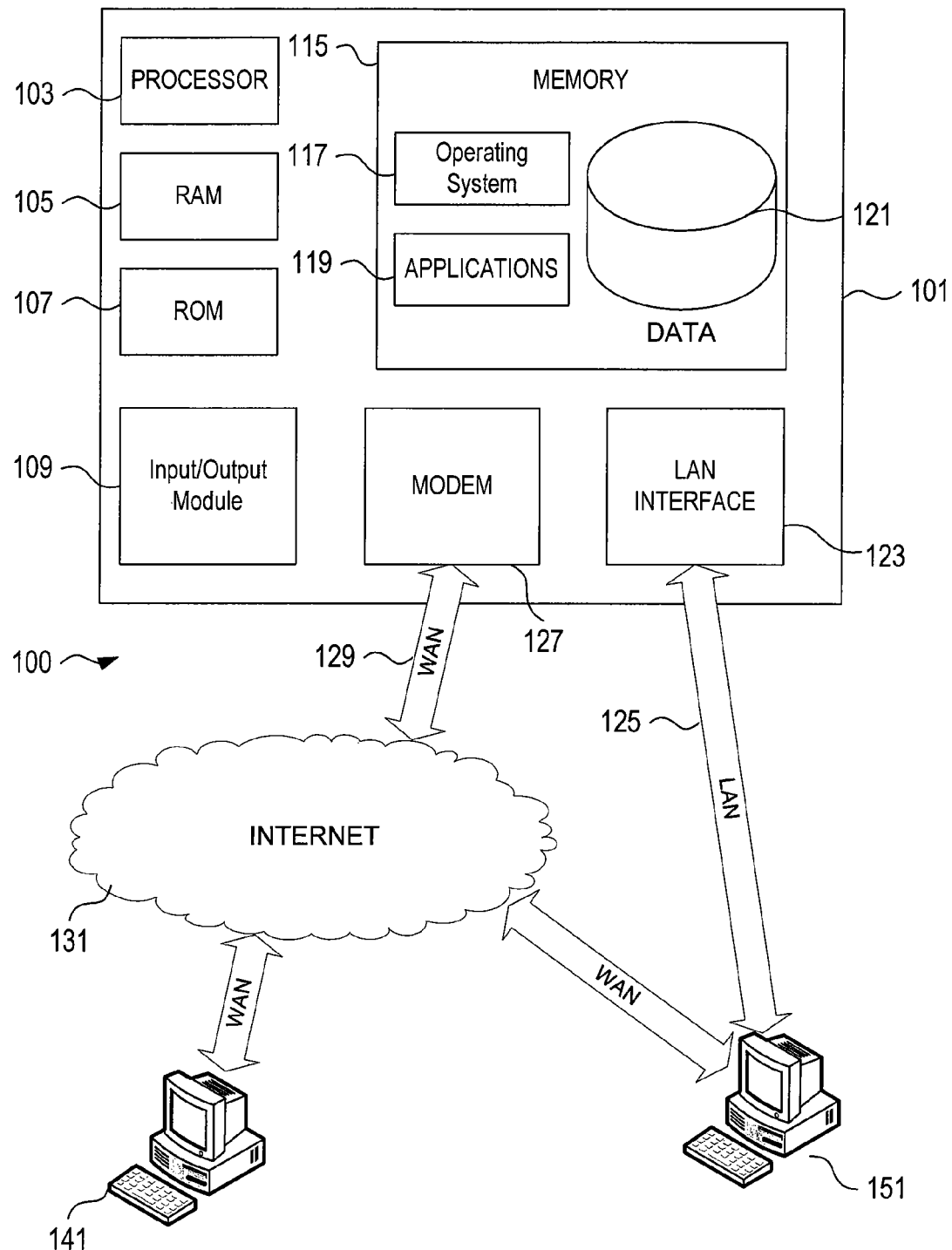
FIG. 1 illustrates a computing device for implementing various aspects of the disclosure.

In the following description of various example embodiments of the invention, reference is made to the accompanying drawings, which form a part hereof, and in which are shown, by way of illustration, various example devices, systems, and environments in which aspects of the invention may be practiced. Other specific arrangements of parts, example devices, systems, and environments, including performing the steps of a method in other than the recited order, may be utilized and structural and functional modifications may be made without departing from the scope of the present invention.

In general, as described above, aspects of the invention relate to handling payments and rapidly posting the payments to a customer account. In accordance with at least some aspects of the invention, a payment may be handled in the following manner: (a) a payment may be received at one of a point of sale and a remote payment acceptance and processing location; (b) data relating to the payment may be identified and may include at least an amount of the payment; (c) the data relating to at least the amount of the payment may be transmitted from the point of sale or a remote payment acceptance and processing location to a data store on a computer network, the data store being associated with a customer account; (d) saving the data relating to at least the amount of the payment in the data store; (e) applying the payment to a balance in the customer account, where the balance includes a plurality of transactions that may be calculated over a period of time; and (f) the balance may be posted to the customer account in rapid recognition to reflect the payment.

In at least some examples, the method of handling payments may be implemented in a software application for a computing device. As described in greater detail below, the software may be utilized by an entity that receives payments for goods, services, and the like. For example, many business entities may implement a software application or plurality of software applications that handle payments from a transaction that occurs at a point of sale and/or a remote payment acceptance and processing module. The transaction may be posted to the business entity's customer account quickly after the transaction occurs at the point of sale or a remote payment acceptance and processing location to accurately reflect the account balance in the customer's account.

In another example, a method of tracking an account balance in a customer account, comprises: (a) identifying a customer account and assigning a unique identifier to the customer account, the unique identifier being linked to a data store that is associated with the customer account; (b) receiving a payment at one of a point of sale or a remote payment acceptance and processing location for the customer account; (c) calculating an account balance for the customer account, the account balance including at least a first transaction and a second transaction, the first and the second transaction being added together; and (d) alerting the customer of the account balance in a rapid time period after the occurrence of the transaction, the account balance immediately calculated and posted in the customer account. The account balance may represent a current available balance in the customer account.

The method of tracking an account balance may be implemented on a computer network and may be a software application, similar to the type of software application described above. Payments may be communicated over the computer network and may be in the form of cash, credit card, debit card, gift card, charge card, automated teller machine card, negotiable instrument, online bill payment, etc.

The payment handling may also be implemented in the embodiment of an apparatus that includes a memory for storing one or more modules that comprise computer-executable instructions and a processor that is configured to execute the computer-executable instructions in the modules. The memory and processor may be configured to provide a customer account with an accurate total balance after a transaction is received at a point of sale or a remote payment acceptance and processing location. Further, the memory may have one or more devices including a point of sale or remote payment acceptance devices that may be configured to receive a transaction including a transaction amount at a point of sale or a remote payment acceptance and processing location; a transmission module that may be configured to transmit the transaction information to a data store that may be associated with a customer account and saved in the memory, the data store may be configured to store data including the transaction information; and a rapid recognition module that may be configured to calculate a total balance by adding the transaction amount to the total balance, where the rapid recognition module may provide immediate reporting of the total balance to the customer account.

The apparatus embodied in a memory and processor, as described above, may be implemented on a computer network with a plurality of computing devices. For example, a business entity may have a plurality of locations and each location may have one or more point of sale or remote payment acceptance devices that are linked together over a computer network and associated with the same customer account. The customer account may receive information from every point of sale or remote payment acceptance devices at each location. A total balance may include transactions that are received by each point of sale or remote payment acceptance devices.

Figure 2:
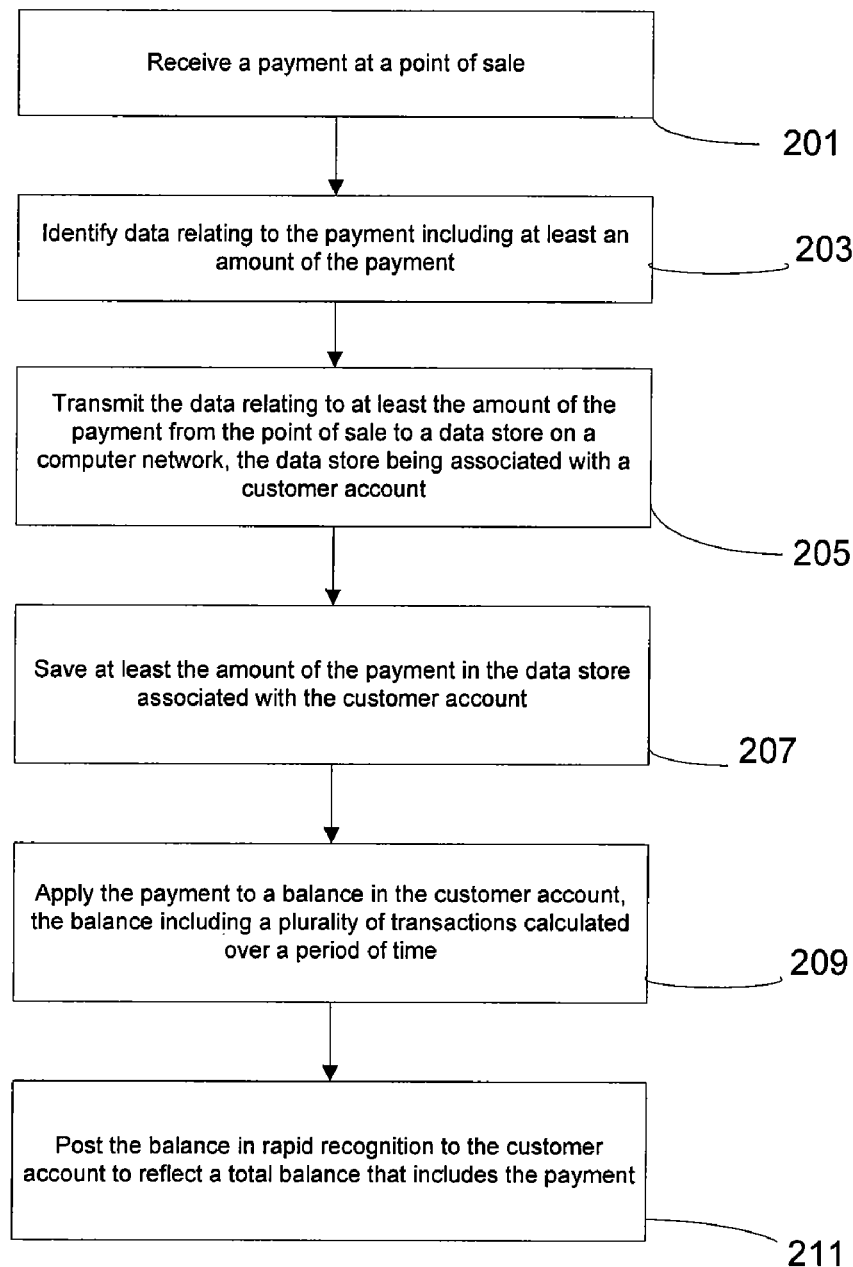
FIG. 2 is a flowchart that illustrates a method of payment handling in accordance with an aspect of the invention.
Figure 3:
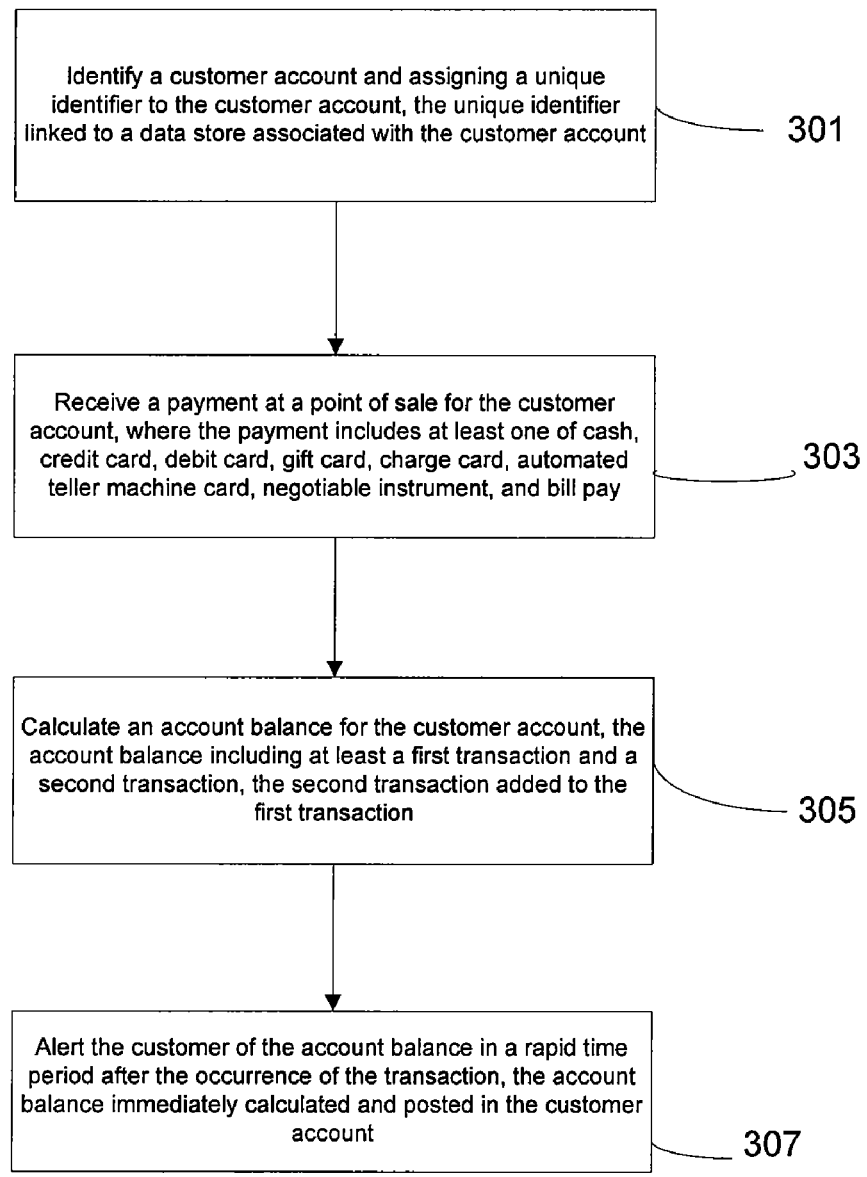
FIG. 3 is a flowchart that illustrates a method of tracking an account balance in a customer account, according to an aspect of the invention.

As described above, the method of handling a payment may be implemented in a variety of embodiments, including the embodiment illustrated in FIG. 2 and another embodiment that is illustrated in FIG. 3. Further, all aspects that are disclosed in each embodiment may be utilized in one or both of the disclosed embodiments of FIGS. 1-4.

FIG. 1 illustrates an example of a computing system environment 100 that may be used according to one or more embodiments of the invention. The computing system environment 100 is only one example of a suitable computing environment and is not intended to suggest any limitation as to the scope of use or functionality of the invention. The computing system environment 100 should not be interpreted as having any dependency or requirement relating to any one or combination of the illustrated components.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, the computing system environment 100 may include a computer 101 having a processor 103 for controlling overall operation of the computer 101 and its associated components, including RAM 105, ROM 107, an input/output module 109, and a memory 115. The computer 101 typically includes a variety of computer readable media.

The computer readable media may be any available media that may be accessed by the computer 101 and include both volatile and nonvolatile media and removable and non-removable media. By way of example, and not limitation, computer readable media may comprise computer storage media and communication media.

Computer storage media may include volatile and nonvolatile and removable and non-removable media implemented in any method or technology for storage of information such as computer readable instructions, data structures, program modules, or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, and any other medium that can be used to store the desired information and that can be accessed by the computer 101.

Communication media may embody computer readable instructions, data structures, program modules, and/or other data in a modulated data signal such as a carrier wave or other transport mechanism. It may also include any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Although not shown, RAM 105 may include one or more are applications representing the application data stored in RAM 105 while the computer is on and corresponding software applications (e.g., software tasks) are being executed.

The input/output module 109 may include a microphone, keypad, touch screen, and/or stylus through which a user of the computer 101 may provide input. The input/output module 109 may also include one or more of a speaker for providing audio output and a video display device for providing textual, audiovisual, and/or graphical output.

Software may be stored within memory 115 and/or storage and may provide instructions to the processor 103 for enabling the computer 101 to perform various functions. For example, the memory 115 may store software used by the computer 101, such as an operating system 117, application programs 119, and an associated data file 121. Alternatively, some or all of the computer executable instructions for the computer 101 may be embodied in hardware or firmware (not shown). As described in detail below, the data file 121 may provide centralized storage of the risk and control assessment.

The computer 101 may operate in a networked environment supporting connections to one or more remote computers, such as computing devices 141 and 151. The computing devices 141 and 151 may be personal computers or servers that include many or all of the elements described above relative to the computer 101. The network connections depicted in FIG. 1 include a local area network (LAN) 125 and a wide area network (WAN) 129 and may also include other networks. The computer 101 is connected to the LAN 125 through a network interface or adapter 123 when used in a LAN networking environment. The server 101 may include a modem 127 or other means for establishing communications over the WAN 129 when used in a WAN networking environment. For example, computer 101 may connect to the WAN 129 such as the Internet 131 through a modem connection. The network connections may include any communications link between computers.

The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the computer 101 according to an embodiment of the invention may include computer executable instructions for invoking user functionality related to communication, such as email, short message service (SMS), and voice input and speech recognition applications.

The computing devices 141 or 151 may also be mobile terminals including various other components, such as a battery, speaker, and antennas (not shown). The input/output module 109 may include a user interface including such physical components as a voice interface, one or more arrow keys, joystick, data glove, mouse, roller ball, touch screen, or the like.

Each of the plurality of computing devices 141, 151 may contain software for creating a data file 121. The software may be a set of detailed computer-executable instructions for the computing devices 141, 151. The software provides the computing devices 141, 151 with the ability to create a data file 121. The data file 121 may contain multiple individual files of information that may each correspond to an individual document.

For example, a data file 121 may include a plurality of customer accounts that each container account information, customer account data, transaction data, etc. Each customer account may be separately contained within the data file 121. Additionally, a report may be generated that includes information relating to one or more customer accounts in the data file 121. A report may include any desirable information. The report may include information for reporting requirements of financial institutions such as for stock holders and government laws and regulations. The report may include all or a portion of the data in the data file 121 and may be customized depending on the needs of the business entity that is generating the report.

The server 101 may include memory 115 for storing computer-readable instructions and a processor 103 for executing the computer-executable instructions. The computer-executable instructions may be data in the form of program source code that is capable of modifying the data file 121. The computer-executable instructions may be a series or sequence of instructions for a computing device that is typically in the form of a programming language such as C++, Java, SQL, or the like. Various computer programming languages may be used to create the computer-executable instructions, and the invention is not limited to the numerous programming languages listed above.

The memory 115 may be a portion of the server 101 that stores data or other instructions. The memory 115 may be retained or lost when power is lost to the system. The memory 115 may provide access to data for a user or computing device 141, 151 to revise and manage a data file 121 or may only provide access to the data file 121. These and other aspects of the memory 115 will be apparent to one of ordinary skill in the art in view of the below description.

The processor 103 may be capable of executing the computer-executable instructions. The computer-executable instructions may be executed by the processor 103 after they have been stored in the memory 115. The processor 103 may be a centralized element within a computing system that is capable of performing computations. For example, the processor 103 may perform the computations that are described in the computer-executable instructions and then execute the computer-executable instructions. In accordance with at least one aspect, the computer-executable instructions may include data describing changes to the data file 121 that were made by a user or computing device 141, 151 over the computer network 131. The server 101 stores the data in the data file 121 that may be associated with a customer's account. The data file 121 may be stored in the memory 115 so that it may be accessible to a plurality of computing devices 141, 151 and/or users.

The data that is stored in the data file 121 may include customer account information, transaction information, payment information, and any other desired information. The data may be stored in the data file 121. Security precautions may be implemented to prevent unauthorized access to the data file 121. A log-on identification and a password may be required to access the data file 121 and/or the payment handling data. Some of the data that is stored in the data file 121 may be shared between multiple lines of business. Any desirable security precautions may be implemented.

The computer-executable instructions may be a series or sequence of instructions for a computing device 141, 151, described in detail throughout this disclosure. The processor 103 may be configured to execute the computer-executable instructions that may be used to assess an application during handling of a payment at a point of sale or a remote payment acceptance and processing location and/or tracking a transaction that is received at a point of sale or a remote payment acceptance and processing location. Such computer-executable instructions may be located (e.g., physically or logically) in modules in the memory 115. The computer network 131 may be any network that interconnects users and/or computing devices 141, 151. According to at least one aspect of the invention, the computer network 131 may provide shared access by two computing devices to at least a portion of the data in the plurality of modules. Shared access may be two or more computing devices 141, 151 that may be coupled to the computer network 131 and/or that may be able to communicate with each other and/or access, change, and add data to a data file 121.

The computer network 131 provides access to the date file 121 that may be shared between the computing devices 141, 151. Additionally, the computer network 131 may be public or private and may be wired or wireless. The computing devices 141, 151 that are connected to the computer network 131 may be any electronic device that is capable of connecting to a computer network and transmitting data over the computer network. Further, the computing devices are capable of receiving data for entry into a data file 121 that may be associated with a handling a payment and/or tracking a transaction.

Aspects of the invention may be described in the general context of computer-executable instructions, such as program modules, executed by one or more computers or other devices. The plurality of modules may include a point of sale or remote payment acceptance modules, a transmission module, and a rapid recognition module. Generally, program modules include routines, programs, objects, components, data structures, etc. that perform particular tasks or implement particular abstract data types. Typically, the functionality of the program modules may be combined or distributed as desired in various embodiments. For example, modules may be logically divided among various files and/or processors.

Furthermore, one or more of the modules may be optional and may be omitted in accordance with various embodiments of the invention.

FIG. 2 illustrates a method of payment handling comprising the steps of receiving payment at a point of sale or remote payment acceptance and processing location, at step 201; identifying data relating to the payment including at least an amount of the payment, at step 203; transmitting the data relating to at least the amount of the payment from the point of sale or a remote payment acceptance and processing location to a data store on a computer network, the data store associated with a customer account, at step 205; saving the data relating to at least the amount of the payment in a data store associated with the customer account, at step 207; applying the payment to a balance in the customer account, the balance including a plurality of transactions calculated over a period of time, at step 209; and posting the balance in rapid recognition to the customer account to reflect the payment, at step 211.

The payment may be received at a point of sale or a remote payment acceptance and processing location at step 201 in any desired manner. For example, a business entity may permit a transaction to be received manually by a teller or cashier or at a self-service station at which a purchaser may input a transaction into a computing device in exchange for goods or services. Specifically, a purchaser may wish to purchase clothing from a retail business entity and to pay with a credit card. The purchaser may arrive at a cash register that is operated by a cashier and provide the cashier with the clothing that the purchaser wishes to purchase and the credit card and/or credit card information that is needed to initiate a credit card transaction at a point of sale or a remote payment acceptance and processing location. The cashier may enter the transaction information into a computing device and a computer network receives the transaction information.

In another example, a purchaser may wish to purchase food at a grocery store. The purchaser may have several options for providing the grocery store with payment for the food such as a cash register that may be operated by a cashier and an automated self-checkout service that may be operated by the purchaser. In both scenarios, the purchaser may provide the grocery store with payment in exchange for food.

In yet another example, a purchaser may wish to make a payment for a utility bill or other government debt. The utility or government agency may receive a payment for a utility bill or other government debt in many forms, including but not limited to, cash at a cash register in an office operated by the utility or government agency, credit card, debit card, charge card, automated teller machine card, online bill payment, and the like over a computer network such as the Internet, and a negotiable instrument such as a personal or cashier's check that may be mailed to the utility or government agency. For example, a purchaser may wish to pay a utility bill over the Internet using online bill payment through a financial institution at which the purchaser may own a checking account. The payment may be received by the utility company from the purchaser through a website on the Internet configured to receive such a payment, an automated telephone program designed to receive payment information, and the like.

A payment may be handled by receiving a payment at a point of sale or a remote payment acceptance and processing location, at step 201. As described above, a point of sale or a remote payment acceptance and processing location may include any position at which payment is received for handling. For example, a remote payment acceptance and processing location may include a retail lockbox, a wholesale lockbox, online bill payment options, and other remote payment options. Payments may be in any acceptable form and the point of sale or a remote payment acceptance and processing location may be any desired configuration. A payment may be received at either a point of sale or a remote payment acceptance and processing location or any location that is capable of receiving a payment.

A payment may include both a credit to the purchaser and a debit to the purchaser. A credit may be a balance that is owed to the purchaser by business entity having a customer account. For example, a purchaser may return merchandise to a retail business entity and the retail business entity may issue a credit, e.g., refund money or provide store credit, to the purchaser. The amount of the credit may be received by the retail business entity at any permissible point of sale or a remote payment acceptance and processing location and may be applied to a balance in the customer account, as described in detail below.

The payment may also include a debit which may be a balance that is owed by the purchaser to a business entity having a customer account. The debit may be a balance that is owed by the purchaser on goods and/or services that are being requested to be purchased may be a debit that is owed on a recurring cycle for goods or services provided to the purchaser on an automatic basis, and the like.

Data relating to the payment may be identified at step 203. The data may include an amount of the payment, a purchaser's payment history with the business entity and its associated customer account, the form of payment, and the like. Additionally, the customer account may implement an alert that provides information to the purchaser at the point of sale or a remote payment acceptance and processing location such as an offer of credit, a coupon for a future purchase, a discount, a sweepstakes entry, a notification of good and/or bad past payment submissions, a notification of future payment due dates, and the like. Any desired information may be included in the data relating to the payment.

The data relating to at least the amount of the payment may be transmitted from the point of sale or the remote payment acceptance and processing location to a data store on a computer network at step 205. The data store may be associated with a customer account. The data store may include any desired data and may be saved on a private network, such as an intranet that is maintained by a financial institution on behalf of a business entity. In this case, the data store may be assigned a unique identifier to define its location on the computer network. For example, the data store may be assigned an Internet Protocol address that defines the location on the computer network at which the data store is saved. However, a file name, e.g., the name seen by a human user, may be associated with a customer account number.

For example, a business entity may establish a customer account with a financial institution. The financial institution may create and maintain a computer network on a server, where the computer network stores files that organize customer account information for the business entity. The financial institution may provide the business entity with access to the data store on the financial institution's server after security information may be confirmed, such as a username and password, a digital certificate, and/or any other desirable security option. Although security is not required, many financial institutions and business entities will implement security measures to protect the private financial and personal information of their purchasers and the business entity.

Further, payment handling may include identifying a unique transaction and alerting the customer account of the unique transaction (not shown). The unique transaction may be a large credit or debt, a new customer account, a duplicate transaction, fraud, such as potentially fraudulent payment for goods and/or services, potentially fraudulent activity with the computer network, and the like. The unique transaction may be reported to the customer account. Further, the unique transaction may include an alert that sends the customer account a message via a text message or other short message service, an email, and/or a telephone message or other messaging service, to terminate a customer account, prevent a purchase or credit from being completed, placing a telephone call to a manager or other operator of the customer account, and the like.

The data relating to the at least the amount of the payment may be saved in a data store that is associated with the customer account, at step 207. The amount of the payment may be added to the existing or "total" balance that is associated with the customer account. For example, a new customer may establish a new customer account having a balance of $0. The first transaction may be a sale of goods and/or services where the purchaser pays with a credit card. The customer account would be credited with the payment amount associated with the goods and services that were sold in an amount of $100 and establish a total balance of $100 in the customer account. A second transaction may also be a purchase of goods and/or services where the purchaser pays with cash in the amount of $50. The second transaction will be added to the balance for a total balance of $150. A third transaction may be the purchaser of the first transaction requesting a refund or credit of a portion of the goods and/or services in the amount of $20 purchased during the first transaction, which would result in a deduction of the corresponding amount of the payment or debit to the customer account for a total balance of $130.

As described above, the payment may be applied to the balance, in step 209. The balance may include a plurality of transactions and may be a total balance of every transaction that relates to a customer account. The total balance may be limited to a specific period of time, including but not limited to, a single business day, fiscal year, calendar year, calendar month, and the like.

The balance may be posted in rapid recognition to the customer account to reflect each payment, as illustrated in step 211. A balance may be posted to the customer account in any desired manner, such as after a payment is submitted for confirmation or after it has been confirmed to be a valid payment. The balance may be made available to a customer associated with a customer account. A customer may also implement a first privilege to a first employee to access a first portion of the customer account and a second privilege to a second employee to access a second portion of the customer account that is different from the first portion of the customer account. For example, the customer may wish to permit employees within its billing, accounts receivable, and accounts payable departments to have access to the customer account to read and edit the data, but may only permit all other employees to read and/or view the data without being permitted to make changes to the data.

The balance may be posted to the customer account to reflect the payment in rapid recognition. Rapid recognition may be providing immediate posting of a payment to a customer account and permitting the customer account to have access to the total balance. For example, a payment may be received at a point of sale or a remote payment acceptance and processing location and immediately posted to the balance in the customer account. In this case, the balance may be made immediately available to the customer upon receipt and transmission of the payment.

Rapid recognition of posting a balance to a customer account may occur in any desired fashion. Rapid recognition may be determined by a period of time defined by the customer within which the payment must be posted and be made available to the customer account. For example, a customer may desire that a payment is posted to its customer account within 2 hours of the receipt of the payment. The payment may be made available to the customer immediately upon posting, within a rapid period of time after posting, at a regular interval, e.g., hourly, daily, etc., or any other desired time period. The rapid recognition may be realized in a balance to provide the customer with an accurate, virtually real-time, reflection of the balance.

As described above, the balance may be immediately posted and therefore, immediately accessible by the customer from the customer account. The customer may rely on the balance in the customer account in making financial decisions for a business entity and may thus have access to the most accurate and current financial information for a business entity. In essence, the rapid recognition of a payment may be virtually immediate, regardless of the location of the point of sale or a remote payment acceptance and processing location from which the payment is received.

The method of payment handling, as described above, may also include reporting the data to the customer. The report may include any desired information, including but not limited to, a daily report of the balance, an itemization of credits and/or debits, a comparison of the balance between a first day and a second day, a first month and a second month, a first year and a second year, and so forth.

In another embodiment illustrated in FIG. 3, a method may track an account balance in a customer account. The method of tracking an account balance in a customer account may include: identifying a customer account and assigning a unique identifier to the customer account, the unique identifier being linked to a data store associated with the customer account, as illustrated in step 301; receiving a payment at a point of sale or a remote payment acceptance and processing location for the customer account, where the payment includes at least one of cash, credit card, debit card, gift card, charge card, automated teller machine card, negotiable instrument, and online bill payment, as illustrated in step 303; calculating an account balance for the customer account, the account balance including at least a first transaction and a second transaction, the second transaction added to the first transaction, as illustrated in step 305; and alerting the customer of the account balance in a rapid time period after the occurrence of the transaction, the account balance immediately calculated and posted in the customer account, as illustrated in step 307; where the account balance represents a current available balance in the customer account.

As described above, the unique identifier, such as an Internet Protocol address, may identify the customer account that is linked to a data store on a computer network. The account balance of the customer account may be calculated in any desired manner, including, but not limited to, providing a history of each payment that was received into a customer account including a plurality of transactions. For example, the account balance may include a first transaction and a second transaction that are added together to provide an account balance. The first transaction may be a credit to the customer account and the second transaction may be a debit to the customer account. In another example, the first transaction and the second transaction are both a credit to the customer account or a debit to the customer account. The current available balance may be representative of the account balance that is available within a rapid time period after the occurrence of the transaction.

In yet another embodiment, a computer-readable medium may include computer-readable instructions for performing a method, comprising the steps of: receiving a payment at a point of sale or a remote payment acceptance and processing location; identifying data relating to the payment including at least an amount of the payment; transmitting the data relating to at least the amount of the payment from the point of sale or a remote payment acceptance and processing location to a data store on a computer network, the data store associated with a customer account; saving the data relating to at least the amount of the payment in a data store associated with the customer account; applying the payment to a balance in the customer account, the balance including a plurality of transactions calculated over a period of time; and posting the balance in rapid recognition to the customer account to reflect the payment.

Aspects of the invention have been described in terms of illustrative embodiments thereof. Numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional. The methods and systems of the above-referenced embodiments may also include other additional elements, steps, computer-executable instructions, or computer-readable data structures. In this regard, other embodiments are disclosed herein that can be partially or wholly implemented on a computer-readable medium, for example, by storing computer-executable instructions or modules or by utilizing computer-readable data structures.

What is claimed is:

1. A method of payment handling, comprising:

identifying a customer account and assigning a unique identifier to the customer account, the unique identifier linked to a data store associated with the customer account, wherein the customer account is configured such that a first entity has a first set of access privileges and a second entity has a second set of access privileges, wherein the unique identifier includes an Internet Protocol address:

receiving a first data message from a remote payment acceptance processing location of a customer associated with the customer account, wherein the first data message comprises information indicating receipt of a payment at the remote payment acceptance processing location, wherein the information includes at least an amount of the payment and wherein the payment includes a credit and a debit to the customer, wherein the payment includes a transaction processed with at least one of cash. credit card, debit card, gift card, charge card, automated teller machine card, negotiable instrument, and online bill payment, wherein the remote payment acceptance processing location is a point of sale, wherein the remote payment acceptance processing location includes at least one of a cash register, an Internet website, retail lockbox, wholesale lockbox, and an automated telephone program, wherein the credit results from return of merchandise to a business entity, wherein the debit results from purchase of at least one of goods and services, transmitting a second data message to the data store, wherein the second data message comprises data relating to at least the amount of the payment, wherein the data store includes information about a payment history of the customer account, wherein the data store is configured to be accessible by the customer upon receipt of a username and password;

applying the payment to a balance in the customer account, the balance including a plurality of transactions calculated over a period of time;

posting the balance in rapid recognition to the customer account to reflect a total balance that includes the payment after applying the payment to the balance in the customer account;

updating an available balance after completion of posting the balance in rapid recognition to the customer account, wherein the updating the available balance includes making the available balance available to the customer, and wherein the available balance includes an entirety of the payment;

permitting funds reflected by the available balance to be accessible by the customer associated with the customer account;

identifying a unique transaction and sending an alert message for receipt by the customer, wherein the alert message includes information about the unique transaction, wherein the information is chosen from the group consisting of: a notification of good or bad past payment submissions, a notification of future payment due dates, a sweepstakes entry, a coupon for a future purchase, and a discount;

sending a reporting message for receipt by the customer, the reporting message indicating the available balance, an itemized listing of credits and debits during a predetermined time period, and a comparison of the available balance to a previous balance; and relying on the accessibility of the funds to make a financial decision for the customer, wherein the method of payment handling is performed in a virtually real-time fashion.

2. A method of tracking an account balance in a customer account, comprising:

identifying the customer account and assigning a unique identifier to the customer account, the unique identifier linked to a data store associated with the customer account;

receiving a data message comprising information indicating receipt of a payment at a remote payment acceptance processing location for a customer associated with the customer account, where the payment includes a payment transaction being processed with at least one of cash, credit card, debit card, gift card, charge card, automated teller machine card, negotiable instrument, and online bill payment;

calculating the account balance for the customer account upon receipt of the data message, the account balance including at least a first transaction and a second transaction, the second transaction added to the first transaction, wherein the first and second transactions include a credit to the customer, wherein the second transaction further includes the payment;

sending a second message for receipt by the customer associated with the customer account of the account balance in a rapid time period after the occurrence of the second transaction and after calculating the account balance, the account balance posted in the customer account;

updating an available portion of the account balance after the account balance is calculated and posted in the customer account, wherein the updating the available portion of the account balance includes making the available portion of the account balance available to the customer, wherein the available portion of the account balance includes an entirety of the credit;

making funds reflected by the available portion of the account balance accessible to the customer associated with the customer account in a virtually real-time fashion after the available portion of the account balance is updated; and identifying a unique transaction and sending an alert message for receipt by the customer, wherein the alert message includes information about the unique transaction, wherein the information comprises a notification of good or bad past payment submissions and a notification of future payment due dates.

3. The method of claim 2, where the available portion includes daily transactions that occur within a single day, wherein the daily transactions are received from at least two discrete remote payment acceptance processing locations.

4. The method of claim 2, wherein the rapid time period is immediate.

5. The method of claim 2, where the unique transaction includes fraud.

6. The method of claim 2, where the unique transaction includes suspicious activity.

7. The method of claim 2, where the data store is saved on a computer network and where the unique identifier includes an Internet Protocol address and a customer account number.

8. The method recited in claim 2, wherein the remote payment acceptance processing location is a point of sale.

9. An apparatus for handling payments, comprising:

a memory storing a plurality of modules comprising computer-executable instructions, the plurality of modules including:

a remote payment acceptance module configured to receive messages from a plurality of remote payment acceptance processing locations of a customer, wherein the messages comprise information relating to a payment transaction wherein the information includes a transaction amount of the payment transaction that occurs at one of the remote payment acceptance processing locations, where the payment transaction includes a credit to a customer account;

a transmission module configured to transmit the payment transaction information to a data store that is associated with the customer account associated with the customer and saved in the memory, the data store configured to store data including the payment transaction information;

a rapid recognition module configured to calculate a total available balance by adding the transaction amount to a total balance, wherein the calculating the total available balance includes making the total available balance available to the customer and wherein the total available balance includes an entirety of the credit to the customer account; and a processor configured to execute the computer-executable instructions in the plurality of modules to provide the customer account with the total available balance after the payment transaction is received at the one of the remote payment acceptance processing locations, wherein the processor is further configured to make accessible funds associated with the total available balance to the customer in a virtually real-time fashion after the payment transaction is received at the one of the remote payment acceptance processing locations, and wherein the processor is configured to identify a unique transaction and send an alert message for receipt by the customer, wherein the alert message includes information about the unique transaction, wherein the information comprises a notification of good or bad past payment submissions and a notification of future payment due dates.

10. The apparatus for handling payments recited in claim 9, wherein the remote payment acceptance processing location is a point of sale.

11. A non-transitory computer-readable medium including computer-executable instructions configured to perform a method, comprising:

receiving a first data message from a remote payment acceptance processing location of a customer, wherein the first data message comprises information indicating receipt of a payment at the remote payment acceptance processing location, wherein the information includes at least an amount of the payment, wherein the payment includes a credit to the customer;

transmitting a second data message to a computer network having a data store, wherein the second data message comprises data relating to at least the amount of the payment, the data store being associated with a customer account associated with the customer;

applying the payment to a balance in the customer account, the balance including a plurality of transactions calculated over a period of time; and posting the balance in rapid recognition to the customer account to reflect a total balance that includes the payment after applying the payment to the balance in the customer account;

updating an available balance after completion of posting the balance in rapid recognition to the customer account, wherein the updating the available balance includes making the available balance available to the customer and wherein the available balance includes an entirety of the credit to the customer;

permitting funds reflected by the available balance to be accessible by the customer associated with the customer account; and identifying a unique transaction and sending an alert message for receipt by the customer, wherein the alert message includes information about the unique transaction, wherein the information comprises a notification of good or bad past payment submissions and a notification of future payment due dates, wherein the method is performed in a virtually real-time fashion.

12. The computer-readable medium including computer-executable instructions configured to perform a method recited in claim 11, wherein the remote payment acceptance processing location is a point of sale.

* * * * *